United States Patent
Kuriki et al.

(10) Patent No.: US 12,523,673 B2
(45) Date of Patent: Jan. 13, 2026

(54) AUTOMATIC ANALYSIS DEVICE

(71) Applicant: HITACHI HIGH-TECH CORPORATION, Tokyo (JP)

(72) Inventors: Shun Kuriki, Tokyo (JP); Kazuhiro Noda, Tokyo (JP); Yukinori Sakashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 743 days.

(21) Appl. No.: 17/799,728

(22) PCT Filed: Jan. 21, 2021

(86) PCT No.: PCT/JP2021/002012
§ 371 (c)(1),
(2) Date: Aug. 15, 2022

(87) PCT Pub. No.: WO2021/176875
PCT Pub. Date: Sep. 10, 2021

(65) Prior Publication Data
US 2023/0061292 A1    Mar. 2, 2023

(30) Foreign Application Priority Data
Mar. 5, 2020   (JP) .................................. 2020-038105

(51) Int. Cl.
*G01N 35/04* (2006.01)
(52) U.S. Cl.
CPC ..... *G01N 35/04* (2013.01); *G01N 2035/0437* (2013.01); *G01N 2035/0496* (2013.01)
(58) Field of Classification Search
None
See application file for complete search history.

(56) References Cited

U.S. PATENT DOCUMENTS

| | | | |
|---|---|---|---|
| 2005/0014274 A1* | 1/2005 | Lee | G01N 35/0092 134/30 |
| 2008/0101990 A1* | 5/2008 | Liu | B01L 13/02 422/63 |

(Continued)

FOREIGN PATENT DOCUMENTS

| | | |
|---|---|---|
| CN | 101168160 | 4/2008 |
| CN | 102906572 | 1/2013 |

(Continued)

OTHER PUBLICATIONS

International Search Report PCT/JP2021/002012 dated Apr. 6, 2021.
Chinese Office Action received in corresponding Chinese Application No. 202180013243.7 dated Jun. 27, 2025.
"Hitachi 7080", Gansu Science and Technology, Nov. 2008, pp. 23-24, vol. 24, No. 22, China Academic Journal Electronic Publishing House.

*Primary Examiner* — Benjamin R Whatley
*Assistant Examiner* — Curtis A Thompson
(74) *Attorney, Agent, or Firm* — MATTINGLY & MALUR, PC

(57) ABSTRACT

Provided is an automatic analyzer capable of reducing risks such as infection, injury, and damage to the device caused by manual operation of a user. In the automatic analyzer according to the present disclosure, an unused vessel holding unit is configured to be able to hold a cleaning member that cleans a hole for mounting a reaction vessel, and a reaction vessel transport unit or a specimen probe picks up the cleaning member from the unused vessel holding unit, transports the cleaning member to the reaction vessel mounting unit, and inserts and removes the cleaning member into and from the hole, thereby cleaning the inner surface of the hole.

12 Claims, 7 Drawing Sheets

(56) References Cited

U.S. PATENT DOCUMENTS

| | | | |
|---|---|---|---|
| 2013/0108508 A1* | 5/2013 | Takahashi | G01N 35/0095 422/64 |
| 2013/0311243 A1* | 11/2013 | Taki | G01N 35/00623 705/7.38 |
| 2015/0037214 A1* | 2/2015 | Sakashita | G01N 35/08 422/67 |
| 2015/0044773 A1* | 2/2015 | Kasai | G01N 1/14 422/63 |
| 2015/0125940 A1 | 5/2015 | Oguro et al. | |
| 2017/0043346 A1* | 2/2017 | Welch | B65D 25/24 |
| 2018/0149512 A1* | 5/2018 | Meyer | B05B 1/06 |
| 2019/0351424 A1 | 11/2019 | Shioya et al. | |
| 2020/0355676 A1* | 11/2020 | Xu | B03C 1/01 |

FOREIGN PATENT DOCUMENTS

| | | |
|---|---|---|
| CN | 107430144 W | 12/2017 |
| CN | 110291405 | 9/2019 |
| JP | 2014-142252 | 8/2014 |
| JP | 2015-87345 | 5/2015 |
| JP | 2017-194325 A | 10/2017 |
| WO | 2016/164740 A1 | 10/2016 |

\* cited by examiner

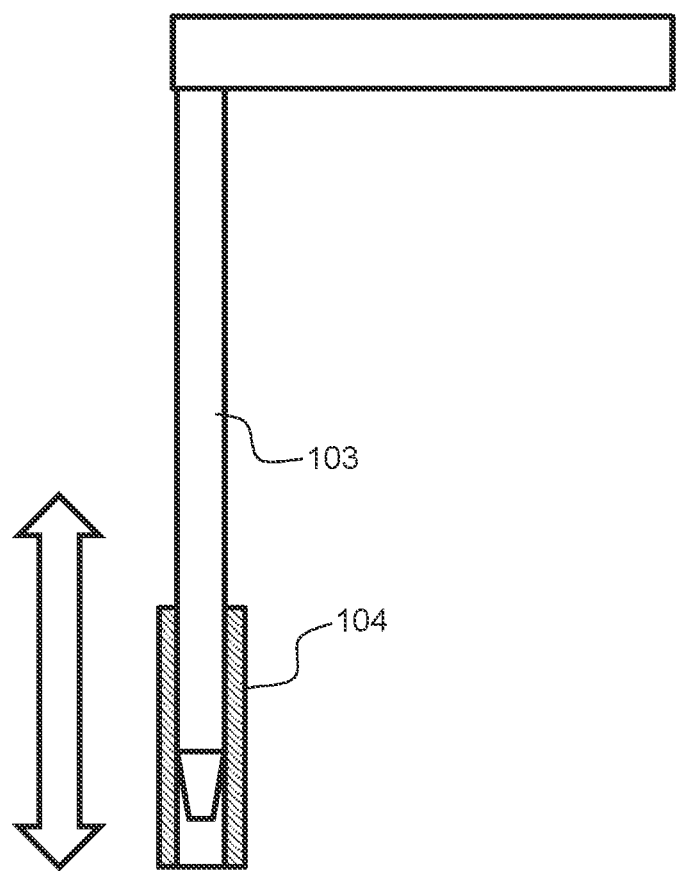

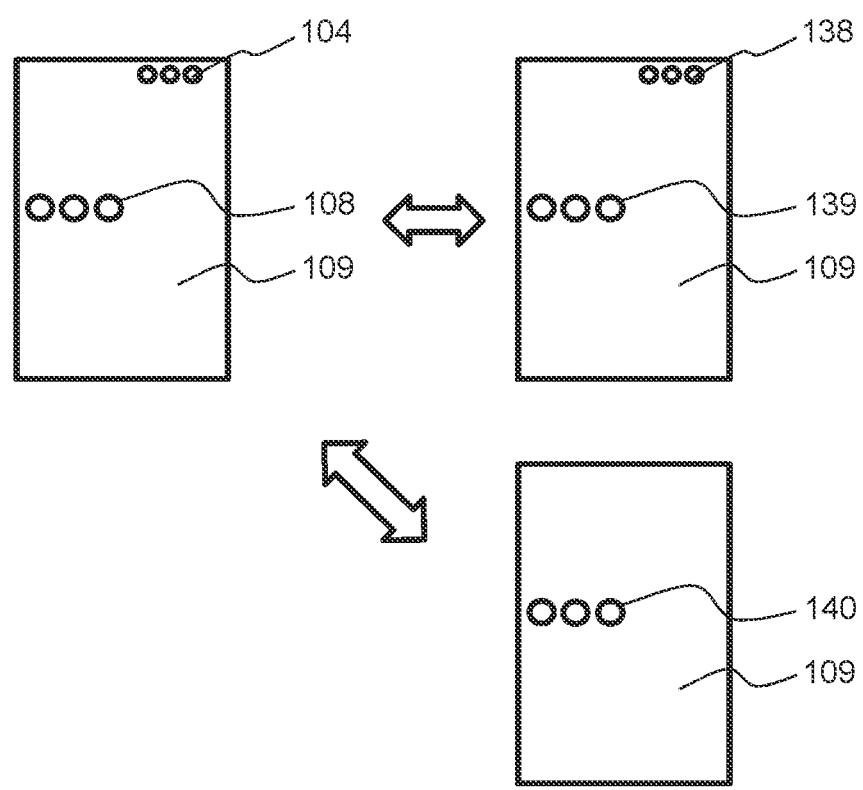

AUTOMATIC ANALYSIS DEVICE

TECHNICAL FIELD

The present disclosure relates to an automatic analyzer.

BACKGROUND ART

In analysis by an automatic analyzer, a reagent is added to a reaction vessel into which a biological specimen such as blood or urine has been dispensed, and the reagent reacts with the biological specimen. The automatic analyzer performs qualitative quantitative analysis on the biological specimen by measuring the light absorbance of a reaction solution and the amount of light emitted from the reaction solution.

The analysis performance and reliability of the automatic analyzer may decrease due to dirt or foreign matter adhering to the automatic analyzer. Therefore, while the risk of dirt and foreign matter that adheres to the automatic analyzer when the automatic analyzer is used is considered, it is necessary to provide a system for removing them in some cases.

The following Patent Literature 1 describes a technique relating to a cleaning unit for cleaning a transmission window that transmits light toward a reaction vessel inside a constant-temperature bath. In a state in which the reaction vessel is stopped, the cleaning unit cleans the surface of the transmission window. In a state in which the reaction vessel is moved, the cleaning unit stops the cleaning.

CITATION LIST

Patent Literature

Patent Literature 1: Japanese Patent Application Laid-Open No. 2017-194325

SUMMARY OF INVENTION

Technical Problems

In Patent Literature 1, while the cleaning of the transmission window in a device is automated, the cleaning of the surface of the device is not automated and it is necessary to manually clean the surface of the device. When the cleaning is manually performed, the risk of infection, an injury, damage to the device, and the like may increase due to a lack of user's expertise or unintended contact.

The present disclosure is made in view of such problems as described above and provides an automatic analyzer that can reduce a risk caused by a user's manual task.

Solution to Problems

In an automatic analyzer according to the present disclosure, an unused vessel holding unit is configured to be able to hold a cleaning member that cleans a hole for mounting a reaction vessel, and a reaction vessel transport unit or a specimen probe picks up the cleaning member from the unused vessel holding unit and transports the cleaning number to a reaction vessel mounting unit, inserts and removes the cleaning member into and from the hole to clean an inner surface of the hole.

Advantageous Effects of Invention

According to the automatic analyzer according to the present disclosure, it is possible to reduce a risk caused by a user's manual task.

BRIEF DESCRIPTION OF DRAWINGS

FIG. 5A is a schematic side view showing the structure of a specimen tip 104.

FIG. 6 is a schematic diagram showing a configuration example of a reaction vessel installation unit 109.

DESCRIPTION OF EMBODIMENTS

First Embodiment

Figure 1:
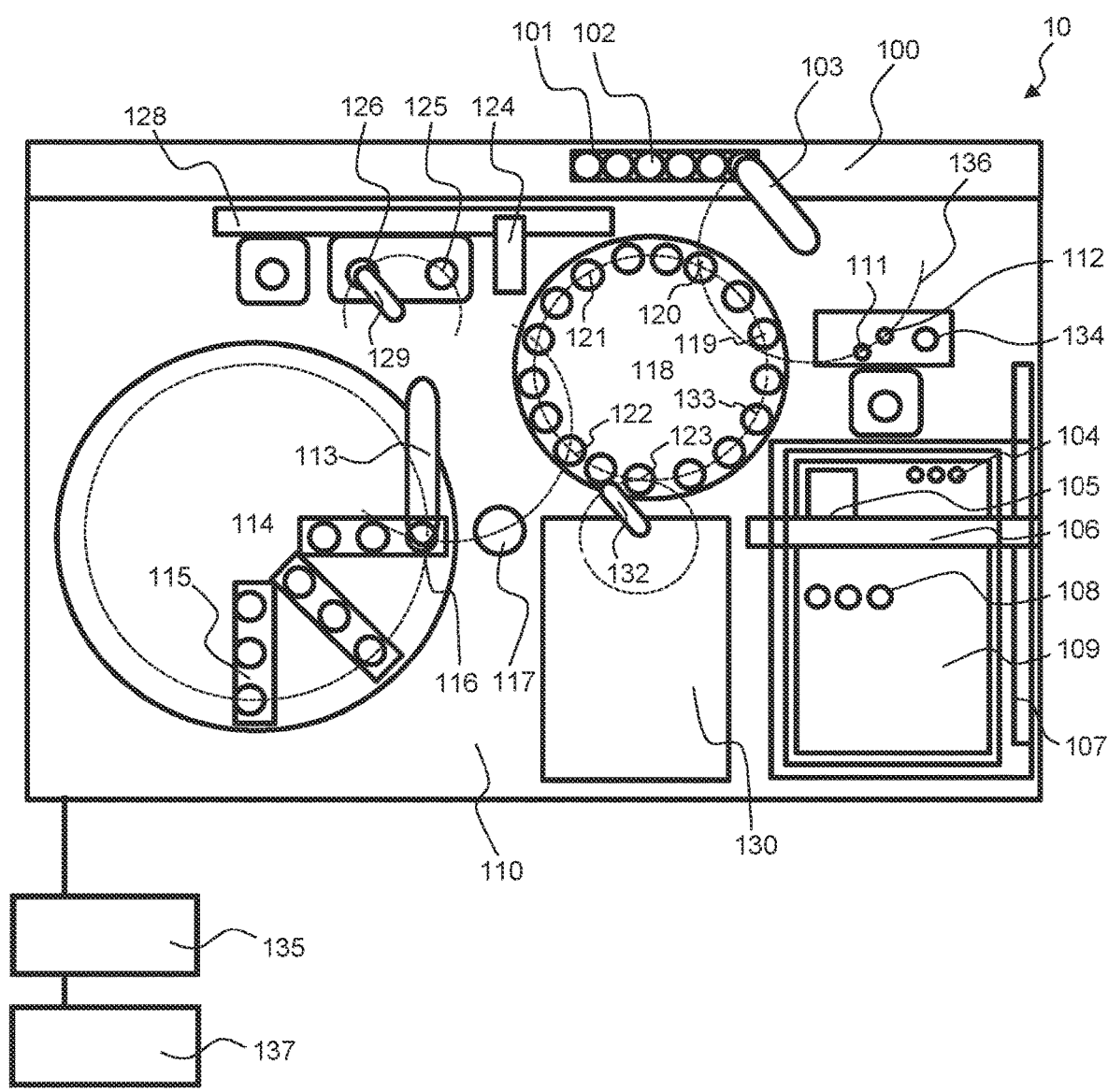
FIG. 1 is a plan view showing a configuration example of an automatic analyzer 10 according to a first embodiment.

FIG. 1 is a plan view illustrating a configuration example of an automatic analyzer 10 according to a first embodiment of the present disclosure. The automatic analyzer 10 is a device that analyzes a specimen by analyzing a reaction solution obtained by causing a reagent to react with a specimen. The automatic analyzer 10 includes a reaction vessel 108 capable of storing the specimen and the reagent. The automatic analyzer 10 includes a first reaction vessel transport unit 105 and a second reaction vessel transport unit 124 as reaction vessel transport units that move the reaction vessel 108. The reaction vessel 108 can move relative to the automatic analyzer (more precisely, for example, a device housing 110).

The reaction vessel 108 placed on a reaction vessel installation unit 109 (unused vessel holding unit) is moved by the first reaction vessel transport unit 105 from the reaction vessel installation unit 109 to a first reaction vessel installation position 119 and installed in a reaction vessel holding hole in a reaction vessel mounting unit (incubator) 118.

A disposable specimen tip 104 placed on the reaction vessel installation unit 109 is moved by a reaction vessel transport unit horizontal moving mechanism 106 of the first reaction vessel transport unit 105 and a reaction vessel transport unit vertical moving mechanism 107 to a specimen tip attachment unit 111 and mounted on the specimen tip attachment unit 111. It is possible to attach the specimen tip 104 to a specimen probe 103 by inserting the specimen probe 103 into an insertion hole of the specimen tip 104 from above. The specimen tip attachment unit 111 functions as a work place for the specimen probe 103 to perform its operation. The shape of the specimen tip 104 is described together with the shape of a cleaning tool 140 in a second embodiment described later.

The specimen probe 103 pivots to attach the specimen tip 104 to an end of the probe at the specimen tip attachment unit 111 on a pivoting trajectory 136. A specimen vessel 102 is transported by a transport unit 100 to a location above a specimen installation unit 101. The specimen put in the specimen vessel 102 is aspirated by the specimen probe 103.

The reaction vessel mounting unit 118 has a plurality of reaction vessel holding holes. The reaction vessel mounting unit 118 rotates to move the reaction vessel 108 installed in a reaction vessel holding hole at the first reaction vessel installation position 119 to a specimen dispensing position 120. After aspirating the specimen, the specimen probe 103 pivots and ejects a defined amount of the specimen into the reaction vessel 108 at the specimen dispensing position 120 on the pivoting trajectory 136. After ejecting the specimen, the specimen probe 103 further pivots and discards the used specimen tip 104 to a specimen tip discarding unit 112 on the pivoting trajectory 136.

A reagent bottle 115 on a reagent disk 114 is rotated and moved by the rotation of the reagent disk 114. When the reaction bottle 115 is present at a reagent aspiration position 116, a first reagent is aspirated by a reagent probe 113 from the reagent bottle 115. Next, the reaction vessel mounting unit 118 rotates to move the reaction vessel 108 to a reagent dispensing position 122.

Next, the reagent probe 113 pivots and ejects a defined amount of the first reagent at the reagent dispensing position 122. The temperature of the reaction vessel mounting unit 118 is controlled to a fixed temperature such as 37° C. The first reagent contains an antibody that specifically binds only to a specific antigen in the specimen. In the reaction vessel 108 mounted on the reaction vessel mounting unit 118, the specimen and the first reagent cause an antigen-antibody reaction.

The first reagent is a component in which the antibody and a fluorescent substance are previously bound. After a certain time period elapses and the antigen-antibody reaction sufficiently progresses, the reaction vessel mounting unit 118 moves the reaction vessel 108 to the reaction reagent dispensing position 122 again.

Next, the reagent probe 113 aspirates a second reagent from the reagent bottle 115. A reagent bottle of the first reagent and a reagent bottle of the second reagent may be separately provided. The reagent probe 113 dispenses the second reagent into the reaction vessel 108 at the reaction reagent dispensing position 122.

The second reagent contains an antibody that specifically binds only to an antigen and is a component in which the antibody and magnetic particles are previously bound. After time elapses and an antigen-antibody reaction progresses to some extent, a sufficient amount of a final reactant bound to magnetic particles and a fluorescent luminous body is produced in the antigen present in the specimen.

Next, the reaction vessel mounting unit 118 rotates and moves to a second reaction vessel installation position 121. The second reaction vessel transport unit 124 moves the reaction vessel 108 of the reaction vessel mounting unit 118 to a reaction vessel cleaning position 126.

At the reaction vessel cleaning position 126, the reaction solution is discarded in a state in which the magnetic particles are captured by a magnet provided outside the reaction vessel using the magnetism of the magnetic particles bound to the antibody in the reaction solution in the reaction vessel. As a result, a substance derived from the specimen other than the antigen is washed away and removed, and only the final reactant remains in the reaction solution (B/F separation).

A cleaning reagent probe 129 ejects a buffer solution at the reaction vessel cleaning position 126. Next, the second reaction vessel transport unit 124 moves the reaction vessel 108 to the second reaction vessel installation position 121 on the reaction vessel mounting unit 118. The second reaction vessel transport unit 124 can be moved by a second reaction vessel transport unit moving mechanism 128.

The automatic analyzer 10 may include a reaction vessel cleaning tank 125 and a probe cleaning tank 117.

Next, the reaction vessel mounting unit 118 rotates to move the reaction vessel 108 to a reaction vessel analysis aspiration position 123. A reaction solution aspiration probe 132 aspirates the reaction solution from the reaction vessel 108 present at the reaction vessel analysis aspiration position 123. Next, the reaction solution aspiration probe 132 sends the reaction solution to a reaction solution analysis unit 130 and measures the amount of light emitted from a fluorescent body.

The reaction vessel mounting unit 118 rotates to move the reaction vessel 108 to a discarded reaction vessel installation position 133. The first reaction vessel transport unit 105 moves the reaction vessel 108 to the reaction vessel discarding unit 134 and discards the reaction vessel 108.

The series of operations described above is controlled by a control unit 135. An analyzing unit 137 acquires the amount of light emitted from the fluorescent body, performs predetermined analysis based on the amount of the light, and outputs a result of the analysis. In the analysis, for example, information (defined liquid amount information) indicating the amount of the specimen, and the principle that the amount of light emitted from the fluorescent body is proportional to the number of antigens are used.

The above description is an example of one analysis operation unit for measurement. The automatic analyzer 10 can perform a plurality of analysis operations at once. In addition, the control unit 135 can control the operations of the automatic analyzer 10 like a pipeline such that the automatic analyzer 10 can perform a plurality of analysis operations simultaneously. In such a configuration, it is possible to perform a process of analyzing a plurality of specimens without stopping the process.

Figure 2:
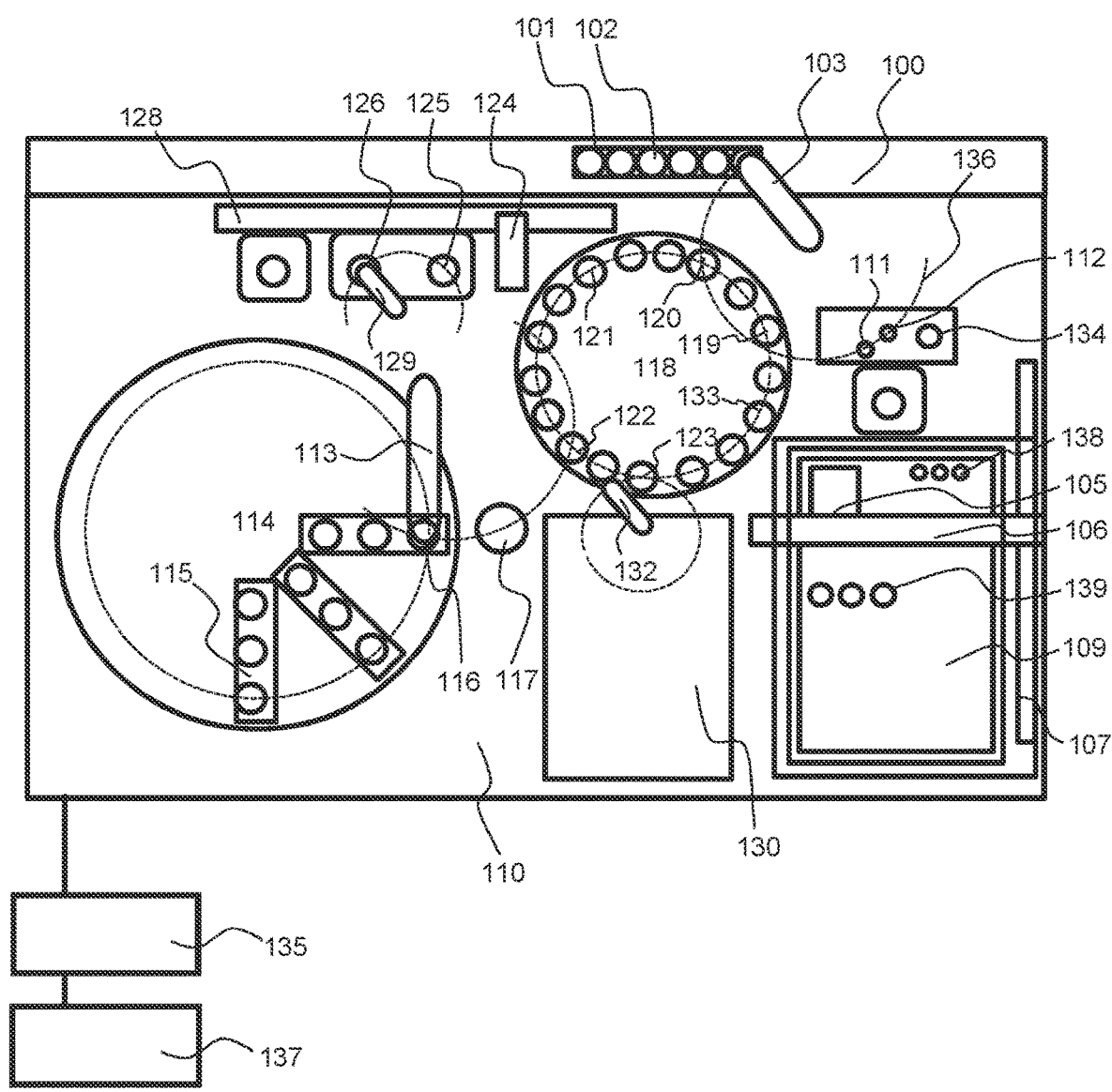
FIG. 2 is a plan view showing a configuration example of the automatic analyzer 10 at a time when a cleaning process is started.

FIG. 2 is a plan view illustrating a configuration example of the automatic analyzer 10 at a point of time when a cleaning process is started. Before the start of the cleaning process, a user removes the reaction vessel 108 and the specimen tip 104 from the reaction vessel installation unit 109 and mounts the cleaning tool 138 and a pure water container 139 filled with pure water instead.

Figure 3:
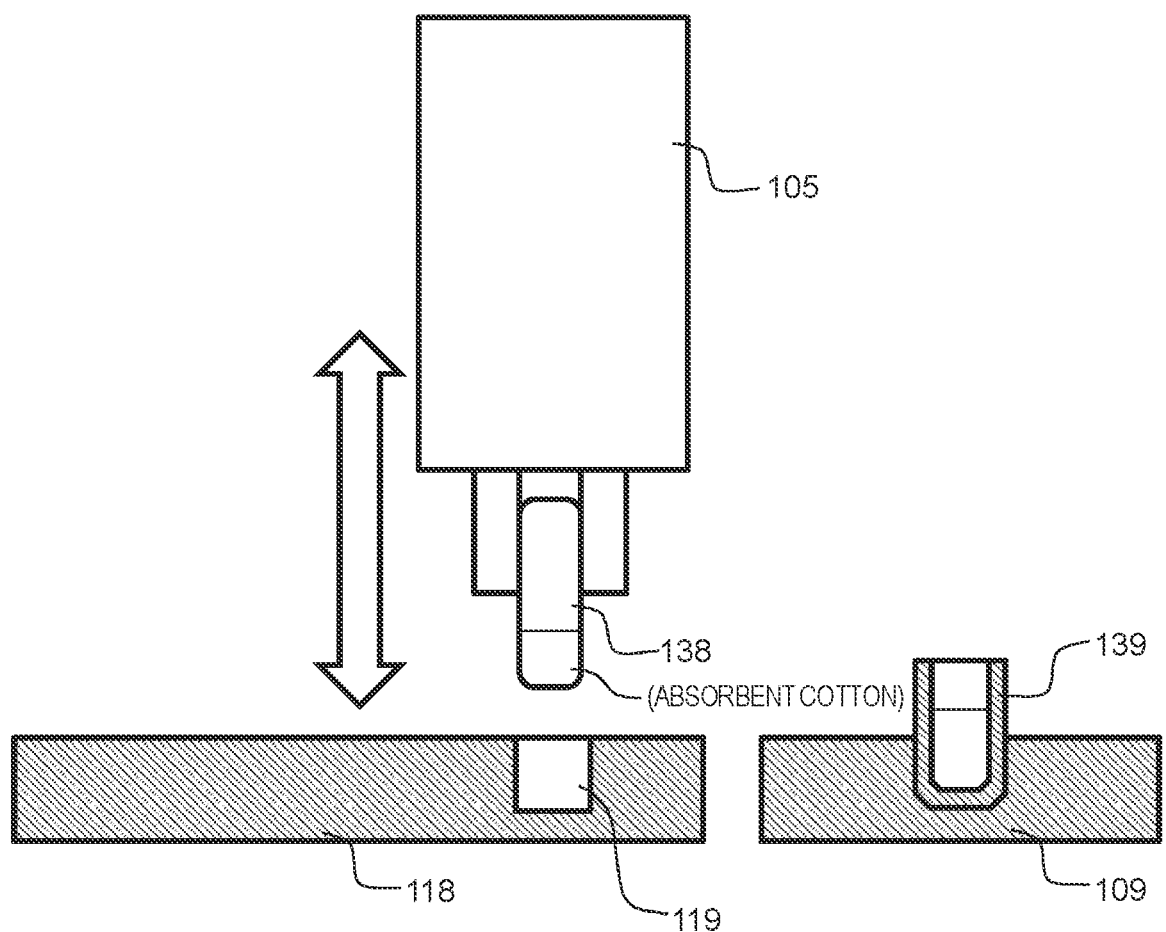
FIG. 3 is a schematic side view illustrating a use example of a cleaning tool 138 and a pure water container 139.

FIG. 3 is a schematic side view describing a use example of the cleaning tool 138 and the pure water container 139. The cleaning tool 138 and the pure water container 139 are constituted as disposable members. The cleaning tool 138 has a shape that can be held by the first reaction vessel transport unit 105 and an end of the cleaning tool 138 is covered with absorbent cotton. The cleaning tool 138 can be mounted on the reaction vessel installation unit 109. The pure water container 139 has a shape that can be held by the first reaction vessel transport unit 105, and pure water can be put in the pure water container 139. The pure water container 139 can be mounted on the reaction vessel installation unit 109.

The first reaction vessel transport unit 105 holds the cleaning tool 138 and moves the cleaning tool 138 to a location above the pure water container 139 while holding the cleaning tool 138. After the movement, the first reaction vessel transport unit 105 lowers the cleaning tool 138 to the inside of the pure water container 139 to dip the end of the cleaning tool 138 in the pure water and raises the cleaning tool 138 to the original position.

The first reaction vessel transport unit 105 moves the cleaning tool 138 to the first reaction vessel installation position 119.

The first reaction vessel transport unit 105 moves the cleaning tool 138 up and down about three times from an upper limit position to the bottom of a reaction vessel holding hole to clean the reaction vessel holding hole with pure water held in the absorbent cotton. After that, the reaction vessel mounting unit 118 rotates to move the next reaction vessel holding hole to the first reaction vessel installation position 119. This operation is repeated until the cleaning of all the reaction vessel holding holes is completed.

The first reaction vessel transport unit 105 moves the held cleaning tool 138 to the reaction vessel discarding unit 134 and discards the cleaning tool 138.

After the first reaction vessel transport unit 105 moves to the pure water container 139 and holds the pure water container 139 storing pure water, the first reaction vessel transport unit 105 moves to the reaction vessel discarding unit 134 and discards the pure water container 139.

The first reaction vessel transport unit 105 moves to a cleaning tool 138, holds the unused cleaning tool 138, and moves the unused cleaning tool 138 to the first reaction vessel installation position 119.

The first reaction vessel transport unit 105 moves the cleaning tool 138 up and down about three times from the upper limit position to the bottom of a reaction vessel holding hole to wipe off the moisture in the reaction vessel holding hole. After that, the reaction vessel mounting unit 118 rotates to move the next reaction vessel holding hole to the first reaction vessel installation position. This operation is repeated until the cleaning of all the reaction vessel holding holes is completed.

The first reaction vessel transport unit 105 moves the held cleaning tool 138 to the reaction vessel discarding unit 134 and discards the cleaning tool 138.

First Embodiment: Conclusion

The automatic analyzer 10 according to the first embodiment picks up the cleaning tool 138 from the reaction vessel installation unit 109, transports the cleaning tool 138 to the reaction vessel mounting unit 118, and cleans the inner surface of the reaction vessel holding hole by inserting and removing the cleaning tool 138 into and from the reaction vessel holding hole. As a result, it is possible to clean a surface portion of the automatic analyzer 10, particularly, dirt of the reaction vessel mounting unit 118 that may affect an analysis result, without a user's manual task. Therefore, the risk of infection caused by the user's manual task, an injury, damage to the device, and the like is reduced.

In the automatic analyzer 10 according to the first embodiment, the reaction vessel installation unit 109 is configured to be able to replace a reaction vessel 108 and a cleaning tool 138 with an unused reaction vessel 108 and an unused cleaning tool 138 and hold the unused reaction vessel 108 and the unused cleaning tool 138. As a result, it is not necessary to newly secure a space for holding the cleaning tool 138 and unnecessarily increase the size of the automatic analyzer 10. However, if it is permissible from the viewpoint of an installation space, the reaction vessel installation unit 109 may be configured to hold the unused reaction vessel 108 and the unused cleaning tool 138, for example. The same applies to a cleaning tool 140 described later.

The automatic analyzer 10 according to the first embodiment wets the cotton swab-shaped cleaning tool 138, which can be held by the first reaction vessel transport unit 105, in the pure water container 139 filled with cleaning water (for example, pure water) and uses the cotton swab thereof to clean the reaction vessel holding hole. By using the member held by the first reaction vessel transport unit 105, it is possible to clean the surface of the reaction vessel mounting unit 118 without using a special member for cleaning and without depending on a user's manual task.

After cleaning the reaction vessel storage hole by the cleaning tool 138 containing pure water, the automatic analyzer 10 according to the first embodiment further uses an unused cleaning tool 138 to wipe off cleaning water remaining on the surface of the reaction vessel storage hole. As a result, it is possible to obtain the effect of the automatic cleaning while suppressing an effect on a subsequent analysis process.

Second Embodiment

The first embodiment describes that the cotton swab-shaped member that can be held by the first reaction vessel transport unit 105 is used as the cleaning tool 138. A second embodiment of the present disclosure describes a member attachable to a specimen probe 103 as another cleaning tool. Configurations other than the cleaning tool are the same as or similar to those described in the first embodiment.

Figure 4:
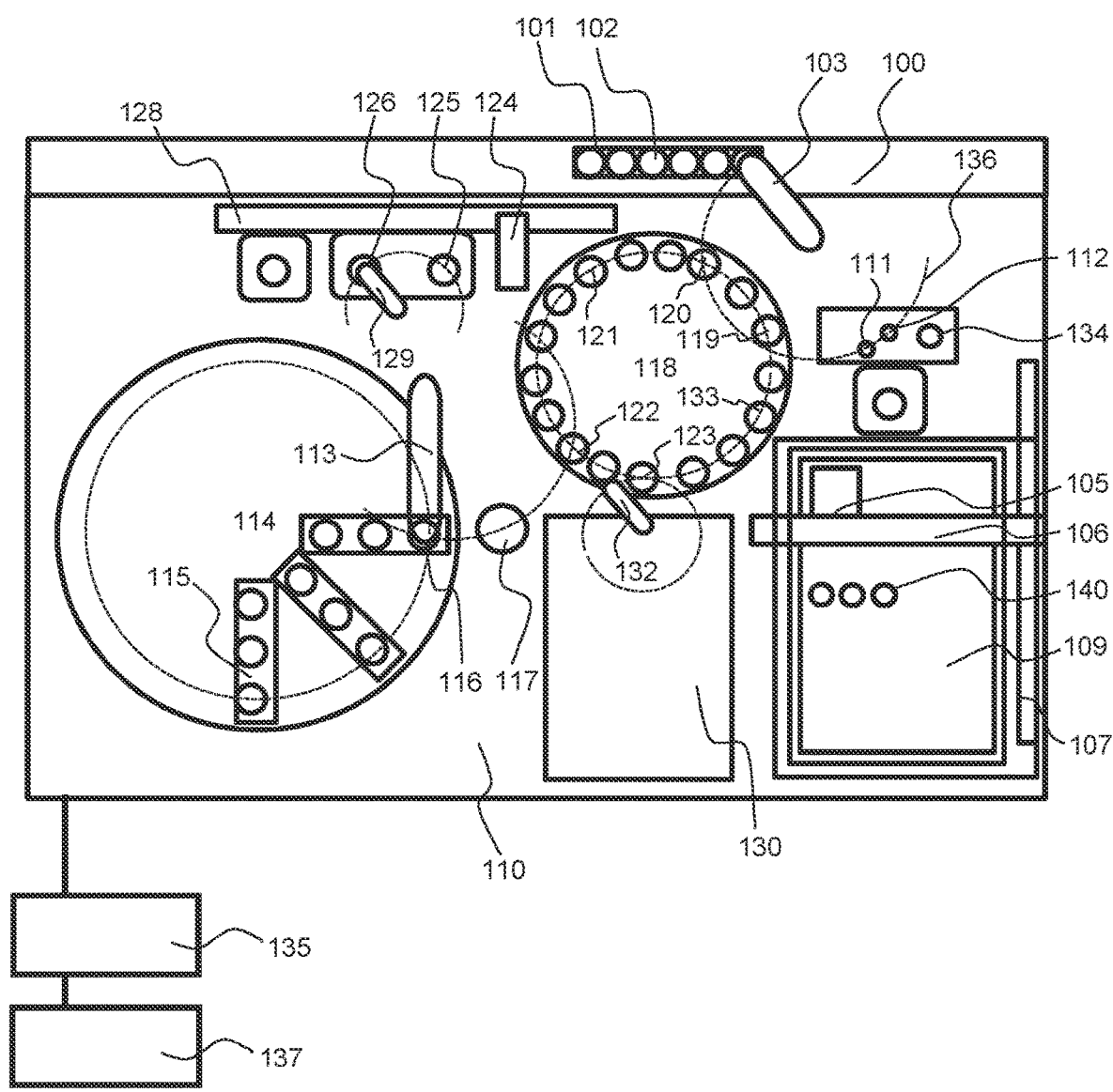
FIG. 4 is a plan view showing a configuration example of an automatic analyzer 10 at a time when a cleaning process is started in a second embodiment.

FIG. 4 is a plan view illustrating a configuration example of an automatic analyzer 10 at a point of time when a cleaning process is started in the second embodiment. Before the start of the cleaning, a user removes a reaction vessel 108 and a specimen tip 104 from a reaction vessel installation unit 109 and mounts a cleaning tool 140 instead.

FIG. 5A is a schematic side view illustrating the structure of the specimen tip 104. The specimen tip 104 has an insertion hole in which the specimen probe 103 is to be inserted from above. By inserting a tip portion of the specimen probe 103 into this insertion hole, it is possible to attach the specimen tip 104 to the specimen probe 103. The specimen probe 103 aspirates a specimen into the specimen tip 104 and ejects the specimen into a reaction vessel in a state in which the specimen tip 104 is attached to the specimen probe 103. The specimen tip 104 after the use is discarded.

Figure 5B:
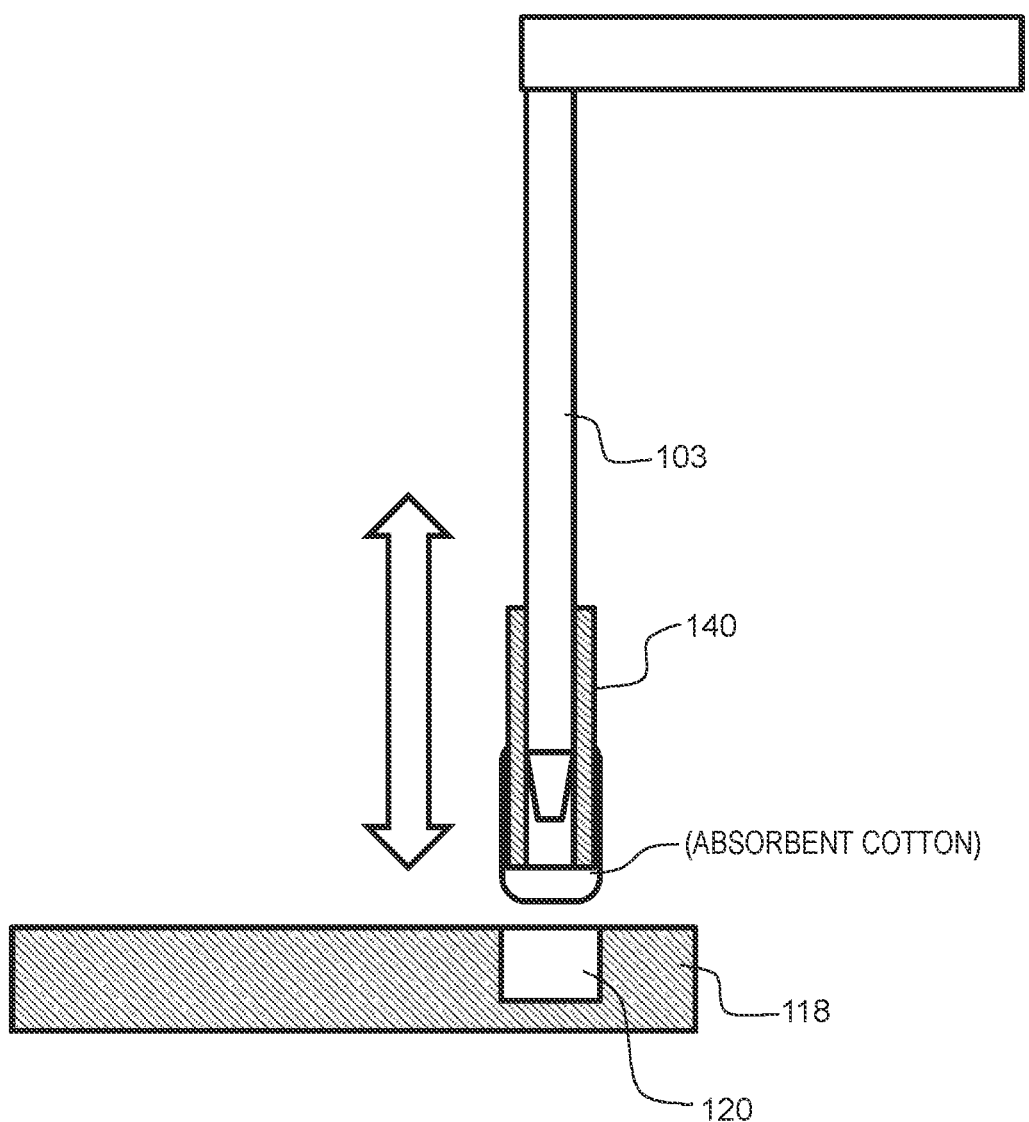
FIG. 5B is a schematic side view illustrating a use example of a cleaning tool 140.

FIG. 5B is a schematic side view describing a use example of the cleaning tool 140. The cleaning tool 140 has a shape that can be held by the first reaction vessel transport unit 105. The cleaning tool 140 has a shape that enables the cleaning tool 140 to be attached to the end of the specimen probe 103 in a similar manner to the specimen tip 104. Specifically, an upper end of the cleaning tool 140 has an insertion hole in which the specimen probe 103 can be inserted. By inserting the specimen probe 103 in this insertion hole, the cleaning tool 140 is attached to the end of the specimen probe 103. That is, since the cleaning tool 140 has a structure similar to the specimen tip 104, the cleaning tool 140 can be attached to the specimen probe 103 by a similar operation to that of the specimen tip 104. The other end of the cleaning tool 140 is covered with a cotton swab.

The first reaction vessel transport unit 105 holds the cleaning tool 140 and moves the cleaning tool 140 to a specimen tip attachment unit 111.

The specimen probe 103 pivots to attach the cleaning tool 140 to the end of the probe at the specimen tip attachment unit 111 on a pivoting trajectory 136, and wets the cotton swab at the end by discharging a cleaning liquid (for example, pure water) into the cleaning tool 140. The specimen probe 103 pivots to move the attached cleaning tool 140 to a specimen dispensing position 120.

The specimen probe 103 cleans a reaction vessel holding hole by moving the cleaning tool 140 up and down about three times from an upper limit position to the bottom of the reaction vessel holding hole. After that, the reaction vessel mounting unit 118 rotates to move the next reaction vessel holding hole to the specimen dispensing position 120. This operation is repeated until the cleaning of all reaction vessel holding holes is completed.

The specimen probe 103 pivots to discard the attached cleaning tool 140 to the specimen tip discarding unit 112.

The first reaction vessel transport unit 105 holds the cleaning tool 140 and moves the cleaning tool 140 to the specimen tip attachment unit 111.

The specimen probe 103 pivots to attach an unused cleaning tool 140 to the end of the probe at the specimen tip attachment unit 111 on the pivoting trajectory 136. The specimen probe 103 pivots to move the attached cleaning tool 140 to the specimen dispensing position 120.

The specimen probe 103 moves the cleaning tool 140 up and down about three times from the upper limit position to the bottom of a reaction vessel holding hole, thereby wiping off the moisture in the reaction vessel holding hole. After that, the reaction vessel mounting unit 118 rotates to move the next reaction vessel holding hole to the specimen dispensing position 120. This operation is repeated until the cleaning of all the reaction vessel holding holes is completed.

The specimen probe 103 pivots to discard the attached cleaning tool 140 to the specimen tip discarding unit 112.

Second Embodiment: Conclusion

The automatic analyzer 10 according to the second embodiment attaches the cleaning tool 140 to the specimen probe 103 to clean the reaction vessel storage hole, and thus can clean dirt of the reaction vessel mounting unit 118 without a user's manual task as in the first embodiment. In addition, since the cleaning tool 140 is held by the reaction vessel installation unit 109, it is not necessary to newly secure a space for holding the cleaning tool 140.

The automatic analyzer 10 according to the second embodiment uses the cleaning tool 140, which can be held by the first reaction vessel transport unit 105 and attached to the specimen probe 103, to clean the reaction vessel storage hole. As a result, it is possible to clean the surface of the reaction vessel mounting unit 118 without using a special member for cleaning and without depending on a user's manual task.

The automatic analyzer 10 according to the second embodiment cleans the reaction vessel storage hole using the cleaning tool 140 having a similar configuration to the specimen tip 104. As a result, it is possible to clean the surface of the reaction vessel mounting unit 118 using the existing specimen probe 103 without using a special member for cleaning.

Third Embodiment

FIG. 6 is a schematic diagram illustrating a configuration example of a reaction vessel installation unit 109. In the first embodiment, the reaction vessel installation unit 109 can be configured as a first plate (or as a member having the first plate mounted thereon) having an unused reaction vessel 108 and an unused specimen tip 104 mounted thereon. In this case, by replacing a second plate having an unused cleaning tool 138 and an unused pure water container 139 mounted thereon with the first plate, the reaction vessel installation unit 109 becomes the state illustrated in FIG. 2. By configuring the reaction vessel installation unit 109 in this manner, it is not necessary for a user to mount cleaning tools 138 on the reaction vessel installation unit 109 one by one and it is convenient.

Similarly, in the second embodiment, by replacing a second plate having an unused cleaning tool 140 mounted thereon with the first plate, the reaction vessel installation unit 109 becomes the state illustrated in FIG. 4. As a result, the user does not need to mount cleaning tools 140 on the reaction vessel installation unit 109 one by one and it is convenient.

<Regarding Modifications of Present Disclosure>

The present disclosure is not limited to the above-described embodiments and include various modifications. For example, the embodiments are described in detail in order to clearly explain the present disclosure and do not necessarily need to have all the configurations described. In addition, it is possible to replace a part of a certain embodiment with a configuration of another embodiment. In addition, it is possible to add a configuration of a certain embodiment to a configuration of another embodiment. In addition, regarding a part of the configurations of the embodiments, addition, removal, or replacement of a part of a configuration of another embodiment is enabled.

Although the embodiments describe that pure water is used as a cleaning liquid, another cleaning liquid that has a small effect on an inspection process may be used. A material for holding the cleaning liquid is not limited to a cotton swab and may be another appropriate water absorbing material.

In the above-described embodiments, it is necessary that the process of cleaning the reaction vessel holding hole using the cleaning tool 138 be performed separately from the process of inspecting the specimen. For example, it is desirable that an operational mode of the control unit 135 be able to be switched between (a) a first mode in which the reaction vessel 108 is mounted on the reaction vessel mounting unit 118 in order to inspect the specimen and (b) a second mode in which the cleaning tool 138 is transported to the reaction vessel mounting unit 118 and inserted in and removed from the reaction vessel holding hole in order to clean the reaction vessel holding hole. Similarly, it is necessary that the process of cleaning the reaction vessel holding hole using the cleaning tool 140 be performed separately from the process of inspecting the specimen. For example, it is desirable that the operational mode of the control unit 135 be able to be switched between (a) a first mode in which the specimen tip 104 is attached to the specimen probe 103 in order to inspect the specimen and (b) a second mode in which the cleaning tool 140 is attached to the specimen probe 103 and inserted in and removed from the reaction vessel holding hole in order to clean the reaction vessel holding hole.

The cleaning tool 138 described in the first embodiment and the cleaning tool 140 described in the second embodiment can be used together. For example, it is considered that the cleaning tool 138 is used to clean a hole at the first reaction vessel installation position 119 before the start of the analysis process and the cleaning tool 140 is used to clean a hole at the specimen dispensing position 120 at an appropriate point of time in the analysis process. Alternatively, it is considered that the cleaning tool 138 is used to clean the hole and the cleaning tool 140 is used to wipe off cleaning water. In these cases, while the two types of cleaning tools are required, there is an advantage that a plurality of cleaning operations can be performed in parallel.

Although the embodiments describe that the reaction vessel holding holes of the reaction vessel mounting unit 118 are cleaned, a hole of another member (for example, the reagent disk 114) can be cleaned in a similar manner. However, since the number of reaction vessel holding holes of the reaction vessel mounting unit 118 is the largest in general, the greatest advantage of automating the cleaning of these holes according to the above-described embodiments is conceivable.

Although the embodiment describes that the cleaning tool 140 is attached to the specimen probe 103, the cleaning tool 140 may be attached to another probe (for example, the reagent probe 113) that aspirates liquid. However, a work place for pushing the probe toward the inside of the cleaning tool 140 from above the cleaning tool 140 is required and thus it is necessary that the work place be newly secured or an existing work place be able to be used.

In the above-described embodiments, each of the control unit 135 and the analyzing unit 137 can be constituted by hardware such as a circuit device having its functions implemented therein or can be configured by an arithmetic device such as a CPU (central processing unit) executing software having its functions implemented therein.

REFERENCE SIGNS LIST

10: automatic analyzer
103: specimen probe
104: specimen tip
105: first reaction vessel transport unit
108: reaction vessel
109: reaction vessel installation unit
118: reaction vessel mounting unit
135: control unit
138: cleaning tool
139: pure water container
140: cleaning tool

The invention claimed is:

1. An automatic analyzer comprising:
    a reaction vessel mounting unit for mounting a reaction vessel that stores a reaction liquid containing a reagent and a specimen;
    a cleaning member that cleans a hole for mounting the reaction vessel included in the reaction vessel mounting unit;
    an unused vessel holding unit for holding an unused reaction vessel that does not store the reaction liquid;
    a reaction vessel transport unit for transporting the reaction vessel from the unused vessel holding unit to the reaction vessel mounting unit; and
    a probe for suctioning a liquid and discharging the liquid to the reaction vessel,
    wherein the unused vessel holding unit is configured to hold the cleaning member instead of the unused reaction vessel or to hold the cleaning member together with the unused reaction vessel, and
    wherein the reaction vessel transport unit or the probe picks up the cleaning member from the unused vessel holding unit, transports the cleaning member to the reaction vessel mounting unit, and inserts and removes the cleaning member into and from the hole to clean the inner surface of the hole.

2. The automatic analyzer according to claim 1, wherein
    the reaction vessel transport unit grasps the cleaning member held by the unused vessel holding unit and picks up the cleaning member from the unused vessel holding unit,
    the reaction vessel transport unit transports the picked-up cleaning member to the reaction vessel mounting unit,
    the reaction vessel transport unit inserts the cleaning member into the hole by lowering the cleaning member from an upper side of the hole in the vertical direction to a lower side, and
    the reaction vessel transport unit removes the cleaning member from the hole by raising the cleaning member from the lower side in the vertical direction to the upper side.

3. The automatic analysis device according to claim 2, wherein
    the cleaning member is a swab,
    the unused vessel holding unit is configured to be able to hold a cleaning liquid container containing a cleaning liquid instead of the unused reaction vessel or to hold the cleaning liquid container together with the unused reaction vessel,
    the reaction vessel transport unit inserts and removes the swab into and from the cleaning liquid container, thereby causing the swab to be impregnated with the cleaning liquid, and
    the reaction vessel transport unit cleans the hole by inserting and removing the swab impregnated with the cleaning liquid into and from the hole.

4. The automatic analyzer according to claim 3, wherein
    the reaction vessel transport unit cleans the hole by inserting and removing the swab impregnated with the cleaning liquid into and from the hole, and then inserts and removes an unused swab into and from the hole, thereby wiping off the cleaning liquid remaining inside the hole.

5. The automatic analyzer according to claim 1, wherein
    the cleaning member is configured to be mountable to the probe,
    the probe mounts the cleaning member held by the unused vessel holding unit, and is transported to the reaction vessel mounting unit,
    the probe inserts the cleaning member into the hole by lowering the cleaning member from an upper side of the hole in the vertical direction to a lower side, and
    the probe removes the cleaning member from the hole by raising the cleaning member from the lower side in the vertical direction to the upper side.

6. The automatic analyzer according to claim 5, wherein
    the probe is configured as a specimen probe that suctions the specimen and discharges the specimen to the reaction vessel,
    the cleaning member includes
        an insertion hole for inserting the specimen probe thereinto, and
        a water-absorbing material attached to the side facing the insertion hole, and
    the specimen probe mounts the cleaning member by inserting a tip portion of the specimen probe into the insertion hole.

7. The automatic analyzer according to claim 6, wherein
after mounting the cleaning member, the specimen probe discharges a cleaning liquid, thereby causing the cleaning liquid to be impregnated with the water-absorbing material, and
the specimen probe cleans the hole by inserting and removing the water-absorbing material impregnated with the cleaning liquid into and from the hole.

8. The automatic analyzer according to claim 7, wherein
the specimen probe cleans the hole by inserting and removing the water-absorbing material impregnated with the cleaning liquid into and from the hole, and then inserts and removes the unused cleaning member into and from the hole, thereby wiping off the cleaning liquid remaining inside the hole.

9. The automatic analyzer according to claim 5, wherein
the probe is configured as a specimen probe that suctions the specimen and discharges the specimen to the reaction vessel,
the specimen probe is configured such that after mounting a specimen tip including a first insertion hole by inserting a tip portion of the specimen probe into the specimen tip, the specimen is suctioned into the first insertion hole, and
the cleaning member includes a second insertion hole for inserting the tip portion of the specimen probe thereinto, and
the specimen probe mounts the cleaning member by inserting the tip portion of the specimen probe into the second insertion hole.

10. The automatic analyzer according to claim 1, wherein
the unused vessel holding unit is configured to be able to exchange a first plate on which the unused reaction vessel is mounted and a second plate on which the cleaning member is mounted.

11. The automatic analyzer according to claim 1, further comprising:
a control unit for controlling the reaction vessel transport unit, wherein
the control unit is configured to be able to switch
a first operation mode in which the reaction vessel is mounted on the reaction vessel mounting unit in order to inspect the reaction liquid, and
a second operation mode in which the cleaning member is transported to the reaction vessel mounting unit and the cleaning member is inserted into and removed from the hole in order to clean the hole.

12. The automatic analyzer according to claim 9, further comprising:
a control unit for controlling the specimen probe, wherein
the control unit is configured to be able to switch
a first operation mode in which the specimen tip is mounted on a tip portion of the specimen probe in order to inspect the reaction liquid, and
a second operation mode in which the cleaning member is mounted on the tip portion of the specimen probe and the cleaning member is inserted into and removed from the hole in order to clean the hole.

* * * * *